United States Patent Office 3,560,538
Patented Feb. 2, 1971

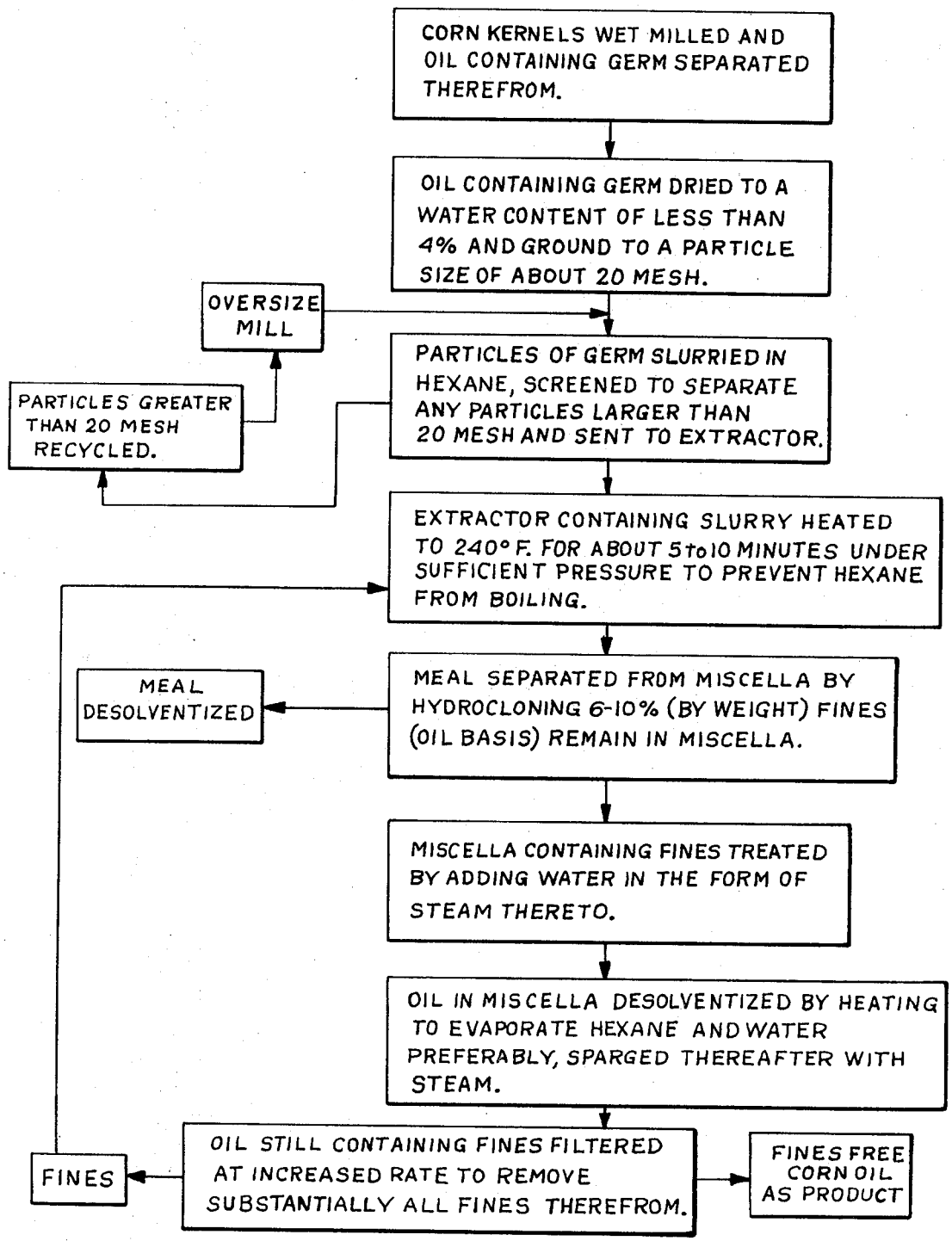

3,560,538
PROCESS FOR REMOVING FINES FROM MISCELLA
John C. Pressick, Clarendon Hills, Ill., assignor to CPC International Inc., a corporation of Delaware
Filed June 27, 1968, Ser. No. 740,694
Int. Cl. C11b 3/00
U.S. Cl. 260—428.5                 12 Claims

ABSTRACT OF THE DISCLOSURE

Troublesome suspended fines in miscella are removed by a filtration technique which comprises adding water to crude miscella before desolventization but after meal separation. By adding water to the miscella at this point in the process, filtration rates significantly greater than those heretofore used in filtering fines from miscella can be achieved.

This invention relates to the production of vegetable oils. More specifically this invention relates to the extraction of fines from vegetable oil miscella.

Vegetable oils are conventionally made by processes which extract the oils from their seeds, germs, etc. The continuous systems used commercially for extraction of oil may be divided into two basic types, percolation and total immersion systems. The percolation type in which solvent is poured through a perforated container carrying the material to be extracted, is the most popular because the extract (hereinafter referred to as miscella) is relatively free of finely divided solid particles (fines).

The second system involves considerably less initial capital investment and is attractive from that standpoint. Here, in total immersion extractors, the material to be extracted is merely suspended in the solvent. However, a long standing problem with extractors of this latter type has been the removal of fines from extract. These fines are detrimental and undesirable since, if unremoved, they cloud the final product and thus either lower its quality or render it totally unacceptable.

In an attempt to overcome this problem with respect to a total immersion extraction system many processes have been devised for removing fines from miscella. Although many of these processes have proved ineffective to meet the high quality oil requirements in today's market place, a few processes have proved successful. Generally speaking, however, these successful processes require elaborate apparatus and extra, time-consuming steps which materially increase the cost of oil production. For example, one well known method of removing fines from miscella is to take the miscella and fines after the general solid particle separation step but before the desolventization step in the above-described basic process and centrifuge it to remove the fines. In practice, it has been found that water must first be added to the miscella in sufficient quantities to hydrate the fines in order that conventional centrifuges may be used to generate adequate force to remove the fines. Even with the addition of water, the centrifuging set-up required by this technique is an elaborate one of high cost and expense.

Another method devised for removing fines from miscella is to use filtration apparatus. Although filtration has proved successful in removing substantially all of the fines from miscella regardless of whether the intial separation step in the above-described basic process constitutes this filtration step or whether it is accomplished by using centrifuges and hydroclones as above described, followed later by filtration of the miscella only, it has been found that the fines are of such a nature as to materially reduce the filtration rate to such a low level as to render the technique of filtration extremely uneconomical.

From this analysis it is clearly seen that there exists a long-felt need for a process of removing fines from vegetable oil miscella which effectively removes substantially all of the fines and thus produce a high quality oil and at the same time is not so elaborate as to render the final product uneconomical.

SUMMARY OF THE INVENTION

This invention sets forth a process of removing fines from miscella which removes substantially all of the fines and thus produces a high quality oil. The process of this invention, however, is not so elaborate as to render the final product uneconomical, but rather is of a non-complicated nature which materially reduces the cost of producing the final product.

Basically, the process of this invention comprises the treatment of a miscella having fines therein in order to render it more easily filterable. Such a treatment comprises adding water to the miscella before desolventization thereof and then, after desolventization, filtering the oil which still contains fines, at an increased filtration rate heretofore impossible to achieve.

BRIEF DESCRIPTION OF THE DRAWING

The figure presented illustrates a flow-chart of a preferred embodiment of this invention.

DETAILED DESCRIPTION OF THE INVENTION INCLUDING PREFERRED EMBODIMENTS

A basic and preferred process for producing a high quality vegetable oil containing substantially no fines as contemplated by this invention generally comprises:

(a) grinding a vegetable seed or germ into small parcles, (b) slurrying the particles so formed with a solvent for the oil contained therein, (c) extracting the oil from the particles with the solvent to thereby form miscella and meal, (d) separating the miscella from the meal by conventional techniques which are expedient but which leave fines in the miscella, (e) adding water to the miscella which contains fines, (f) desolventizing the miscella by a process which comprises evaporation of the solvent with heat, and (g) filtering the solvent-free oil which contains fines to thereby remove the fines and produce a substantially fines-free vegetable oil.

Although it is clear that this invention is applicable to all vegetable oils which may be produced from their raw seed, kernel, or germ by a solvent extraction technique, a preferred oil which may be produced by the process of this invention is corn oil. Examples of other oils are linseed oil, cottonsed oil, and the like. Corn oil is chosen as preferred because it has presented a particularly difficult problem, particularly in total immersion solvent extraction systems, in that fines contained it its miscella have heretofore been extremely difficult to remove economically. For this reason, as well as for clarity, a more detailed disclosure of this invention which follows hereinafter will be primarily directed to the production of corn oil, it being remembered that the invention is not limited thereby.

High quality corn oil may be produced according to a preferred form of this invention by a process as generally illustrated in the FIGURE. Crude corn kernels are initially wet milled to separate the oil-containing germ therefrom. Such milling and separation is well known in the art. The germ is then dried to a water content of about 4% or less. This dried germ is then ground to particles which are capable of passing through a 20 mesh screen. These particles are slurried with a solvent for the oil such as hexane, screened to separate any particles larger than 20 mesh and placed in an extractor. The particles larger than 20 mesh may be reground and returned to the system as illustrated. The extractor is heated to a temperature of about 240° F. and held at this temperature for from 5 to 10 minutes under sufficient pressure so that the solvent (e.g. hexane) does not boil. In this way the corn oil is separated from the solid particles of the germ and placed in solution with the solvent. As defined hereinabove, the entire slurry then contains solid particles called "meal" and a liquid solvent-oil mixture called "miscella." This slurry mixture of meal and miscella may now be separated by any conventional technique such as by crude centrifuging etc. It has been found, however, that the preferred process of separating miscella from meal for purposes of this invention is hydrocloning. Hydrocloning is well known in the art and may be carried out in standard hydroclone apparatus such as a Bauer Hydroclone produced by Bauer Brothers Co. Hydrocloning effectively separates the slurry into meal and miscella but the resulting miscella contains about 6–10% fines (oil basis). The meal is then desolventized.

According to this invention, these fines are now removed by adding to the miscella, water or steam which is believed to hydrate the fines. This water-miscella mixture is sent to an evaporator wherein the water and solvent are evaporated from the oil. Preferably the oil is further treated by sparging it with steam to insure that all of the solvent has been removed. Steam sparging is a process well known in the art which for purposes of this invention generally comprises bubbling steam through the oil under conditions such that condensation does not occur. The essentially solvent free dry oil which still contains fines is then filtered by standard filtration techniques such as through the use of conventional plate-frame press filters to thereby remove the fines and produce a substantially fines-free oil. If desired the fines can then be returned to the extractor for reprocessing. As alluded to hereinabove, the rates operable in this latter filtration process have been found to be materially greater than those operable in a process which uses everyone of the above-stated steps but eliminates the step of adding water to the miscella prior to desolventization but after hydrocloning.

Although this invention is not limited to any specific theory, it is believed that without the critical step of adding water to the miscella prior to desolventization, the particles of fines tend to remain in a form which clogs the filter medium and thus lowers the rate of filtration. On the other hand, when this critical step is coupled with the desolventization technique, the form of the fine particles are apparently altered in such a way that they do not clog the filtration apparatus and in fact allow a materially increased filtration rate to be used. In theory, it is possible that when a wetted particle is heated during a desolventization procedure, it becomes harder since the heat-moisture treatment likely denatures the protein in the particle. A harder particle does not compress as much as a softer one under filtration pressures and thus permits greater filtration rates.

The following examples best illustrate this invention and the unexpected results achieved through its use. They are meant as illustrative of, rather than limitations on, this invention.

EXAMPLE I

Miscella obtained by the standard corn germ grinding-hydrocloning process as described above and containing by weight 25% corn oil and fines, about 6–10% of which is fines (based on oil), was treated by adding water in the form of steam. The resulting mixture was then heated to evaporate the solvent and water. The resulting oil which still contained fines was filtered at 60° C. with a house vacuum through a 5.5-cm. Buchner funnel dressed with No. 1 Whatmann paper. Just before filtration approximately 2% diatomaceous earth was added to the oil. The volume of filtrate obtained during the first ten minutes was measured with the following results:

| Water added to miscella as steam (wt. percent): | Crude oil filtration rate (ml./minutes) |
|---|---|
| 0 | 3.7 |
| 0.6 | 5.2 |
| 1.6 | 10.6 |
| 3.3 | 12.0 |

EXAMPLE II

The basic procedure of Example I was followed except that, after evaporation of the solvent and water, the oil was sparged (stripped) with steam to insure that substantially all of the solvent had been removed. Similar increases in flow rate at about 3% addition of water were recorded.

It can be seen from the above discussion and examples that this invention provides the industry with an economical process for producing fines-free vegetable oils. Once given the above discussion and examples many obvious modifications will become apparent to the skilled artisan and thus are included within this invention, the scope of which is defined by the following claims.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:

1. A process for removing fines from a miscella which comprises first hydrating the fines by adding water or steam to a miscella which contains fines, then desolventizing the miscella to produce an oil which contains fines, and thereafter filtering the oil to remove the fines.

2. A process according to claim 1 wherein said oil is a vegetable oil.

3. A process according to claim 2 wherein said desolventization comprises heating said miscella to evaporate a solvent from said oil.

4. A process according to claim 3 wherein said desolventization includes the step of sparging said oil with steam.

5. A process of producing substantially fines-free corn oil which comprises milling a plurality of corn kernals containing corn germ, separating said germ from the remainder of the kernels, grinding said germ to a smaller particle size, slurrying said ground germ with a solvent for corn oil, extracting corn oil from said germ by dissolving said oil in the solvent to thereby form solid meal and a liquid solution comprised of corn oil and solvent, separating the liquid solution from the solid meal in such a manner that said solution has fines suspended therein, adding water to said liquid solution, desolventizing said liquid solution to thereby form corn oil having fines therein, and filtering said corn oil to remove substantially all of the fines therefrom.

6. A process according to claim 5 wherein said desolventization of said liquid solution comprises heating said solution to evaporate said solvent and water added thereto.

7. A process according to claim 6 wherein said desolventization also includes after said heating step, the step of sparging said oil with steam.

8. A process according to claim 5 wherein before grinding said germ to a smaller particle size said germ is dried to a water content of less than 4%.

9. A process according to claim 5 wherein the solution separated from the solid meal has about 6–10% by weight percent fines (oil basis) therein.

10. A process according to claim 9 wherein said water is added in an amount of from about 0.6 to about 3.3% by weight water per weight of solution.

11. A process according to claim 6 wherein said solvent is hexane.

12. A process according to claim 11 wherein the extraction of said corn oil from said germ comprises heating said slurry to a temperature of about 240° F. for about 5 to 10 minutes under a pressure sufficient to prevent the hexane from boiling.

References Cited

UNITED STATES PATENTS

| | | | |
|---|---|---|---|
| 2,786,859 | 3/1957 | Christensen | 260—428.5 |
| 3,025,314 | 3/1962 | King et al. | 260—412.4 |

LEWIS GOTTS, Primary Examiner

E. G. LOVE, Assistant Examiner